(12) United States Patent
Miller, Jr. et al.

(10) Patent No.: US 6,327,220 B1
(45) Date of Patent: Dec. 4, 2001

(54) SONAR LOCATION MONITOR

(75) Inventors: Benjamin K. Miller, Jr., League City, TX (US); James E. Halwachs, Ferndale, WA (US); Arnold F. Farstad, Boulder, CO (US)

(73) Assignee: Johnson Engineering Corporation, Webster, TX (US)

( * ) Notice: Subject to any disclaimer, the term of this patent is extended or adjusted under 35 U.S.C. 154(b) by 0 days.

(21) Appl. No.: 09/396,232

(22) Filed: Sep. 15, 1999

(51) Int. Cl.⁷ .................................................. H04B 13/02
(52) U.S. Cl. ................................................... 367/134
(58) Field of Search ............................ 367/134, 6, 129, 367/4, 910, 131

(56) References Cited

U.S. PATENT DOCUMENTS

| | | |
|---|---|---|
| 3,602,877 | 8/1971 | Currie et al. |
| 3,953,843 | 4/1976 | Codina ................................. 340/224 |
| 3,969,712 | 7/1976 | Butman et al. ....................... 340/261 |
| 4,079,364 | 3/1978 | Antenore .............................. 340/279 |
| 4,121,200 | 10/1978 | Colmenero .......................... 340/539 |
| 4,187,502 | 2/1980 | Beverly et al. ...................... 340/566 |
| 4,305,143 | 12/1981 | Simms et al. ........................ 367/134 |
| 4,307,449 | 12/1981 | Strubin ................................. 364/418 |
| 4,336,591 | 6/1982 | Berdzar et al. ...................... 364/418 |
| 4,337,527 | 6/1982 | Delagrange et al. ................ 367/98 |
| 4,459,689 | 7/1984 | Biber ................................... 367/107 |
| 4,549,169 | 10/1985 | Moura et al. ........................ 340/539 |
| 4,635,242 | 1/1987 | Hart .................................... 367/134 |
| 4,747,085 | 5/1988 | Dunegan et al. .................... 367/93 |
| 4,813,025 * | 3/1989 | Rowland et al. ..................... 367/6 |
| 4,932,009 | 6/1990 | Lynch .................................. 367/153 |
| 4,949,072 | 8/1990 | Comerford et al. ................. 340/525 |
| 4,999,606 | 3/1991 | Comerford et al. ................. 340/525 |
| 5,006,831 | 4/1991 | de Solminihac .................... 340/573 |
| 5,019,822 | 5/1991 | Kirkland ............................. 342/22 |
| 5,049,859 | 9/1991 | Arnell ................................. 340/573 |
| 5,097,254 | 3/1992 | Merrithew .......................... 340/573 |
| 5,408,222 | 4/1995 | Yaffe et al. ......................... 340/604 |
| 5,486,814 | 1/1996 | Quinones ............................ 340/573 |
| 5,619,187 | 4/1997 | Serfontein .......................... 340/573 |
| 5,784,339 * | 7/1998 | Woodsum et al. ................... 367/134 |

* cited by examiner

Primary Examiner—Daniel T. Pihulic
(74) Attorney, Agent, or Firm—Rossi & Associates

(57) ABSTRACT

A system is disclosed for locating swimmers who could be in danger of drowning, as determined by preset parameters such as the time duration that they remain at a depth where breathing is impossible. In this system, each individual swimmer wears a SONAR Swimmer Location Monitor (SSLM). This is a miniature electronic device that not only determines the extent of the swimmer's danger but also emits an ultrasonic alarm signal whenever such danger exists. At each occurrence, an alarm, which may be audible and/or visual, is sounded on the surface. Meanwhile the swimmer's location is tracked in real time from the signals received on a hydrophone array deployed along the perimeter of the swimming area. These signals are combined in a central processor and the computed real-time location is displayed graphically on a monitor to guide the guard personnel in rescue operations. The invention is intended for use in pools, beaches, water parks, and other swimming areas.

48 Claims, 9 Drawing Sheets

SONAR LOCATION MONITOR

CROSS REFERENCE TO RELATED APPLICATIONS

Not applicable.

STATEMENT REGARDING FEDERALLY SPONSORED RESEARCH

Not applicable.

BACKGROUND OF THE INVENTION

The present invention relates generally to a personnel location device or system, and, more particularly, to a sonar location monitor for indicating and/or determining the location of a person (i.e., a swimmer) in a water environment (such as a lake, pool, or beach swimming area).

Swimmer safety is an important concern in all water sports and activities. Lifeguards are assigned the responsibility of protecting the lives of the swimming public. However lifeguards can monitor only limited portions of a swimming pool, water park, or beach area and have particular difficulty in seeing what goes on near the bottom. In many instances, despite the presence of lifeguards, help for a swimmer in trouble comes far too late to prevent drowning. Even with adequate staffs, lifeguards often find it difficult to monitor large numbers of swimmers.

There have been attempts at developing automatic alarm equipment to warn the staff of swimmers in danger. Several of these inventions have focused on protecting children from drowning in backyard pools. (See, e.g., U.S. Pat. Nos. 3,953,843 3,969,712 4,079,364 4,121,200 4,187,502 4,747,085 5,049,859.) The devices described by these patents simply monitor the presence of an unauthorized swimmer or object in the pool. These devices are designed for very small pools and do not possess any location or tracking capabilities.

Some devices for detecting a swimmer in the water are known. Many of these detection methods rely on some variation of an acoustic technique. For example U.S. Pat. No. 4,337,527 describe a system that uses ultrasonic transmission through water to identify underwater targets. A human operator listening to headphones classifies the target and determines its location. U.S. Pat. No. 4,459,689 describes an apparatus utilizing combination energy transmitting and receiving transducer for detecting and locating objects within a plurality of zones. U.S. Pat. No. 4,635,242 describes an underwater signaling device utilizing acoustic sound generators. Several devices for detecting swimmers in distress are known. (See, e.g., U.S. Pat. Nos. 4,932,009 and 5,097,254.) However, these devices do not pinpoint the location of the distressed swimmer.

Therefore, of particular interest is the development of a system for monitoring a large number of swimmers in a pool, beach area, or water park. Such a system would be capable not only of monitoring the status of a large number of swimmers but would also be capable of pinpointing the location of a swimmer in distress with sufficient warning to permit a timely rescue.

All references cited herein are incorporated by reference.

BRIEF SUMMARY OF THE INVENTION

The present invention is similar to a system disclosed in U.S. Pat. No. 5,907,281 by the same inventors (the entire disclosure of which is hereby incorporated by reference) in that its use overcomes many of the disadvantages of the prior art in tracking swimmers in pools, beaches, and water parks. The prior methods do not possess automatic location and tracking capability. In fact many of the systems cited above are designed for simple detection of a water disturbance and as such can identify only the presence or absence of an object in the pool.

An objective of the invention is to provide an improved apparatus or system for detecting and locating swimmers at risk in a timely manner that would facilitate their rescue and prevent many of the drownings that occur each year. This objective can also encompass locating non-swimmers or small children who enter the water.

The invention provides a low frequency SONAR surveillance system for tracking the location of swimmers who may be in peril. By definition, SONAR stands for SOund NAvigation and Ranging. The invention includes the equipping of each swimmer with an individual Sonar Swimmer Location Monitor (SSLM) that transmits a series of ultrasonic pulses when specified safety thresholds of time and depth are exceeded. The invention utilizes a "pinger" to generate pulses that can be received by a network of hydrophones deployed around the perimeter of the pool. A hydrophone is an underwater microphone or transducer designed to detect or receive sound underwater. The invention also is capable of amplifying, filtering, and processing the received signals resulting in a graphical and/or numerical display of the distressed swimmer's location. The invention is also capable of triggering an alarm (audible or visual) whenever specified safety thresholds are exceeded.

The invention provides a miniaturized electronic device, or SSLM, that can be worn by a swimmer to enhance his/her safety during recreational swimming in crowded pools, beaches, and water parks. The SSLM can detect or measure swimmer distress by any number of criteria, including, but not limited to, detecting water pressure, water depth, the amount of time spent in the water, submersion in water, and/or any combination of these.

The invention provides a device to transmit omnidirectional ultrasonic pulses from a miniature transducer called a pinger contained in the SSLM.

The invention also provides a receiver network composed of hydrophones deployed at strategic locations around the pool. In one preferred embodiment the invention provides a system in which the hydrophones are deployed in the four corners of the pool as well as along each side of the pool.

The invention is capable of being automatically powered on whenever it is simply immersed in water, or immersed in water at a pre-selected depth and/or period of time, and automatically powering down whenever it leaves the water. The invention further is capable of powering "ON" in a monitor mode. In the monitor mode the unit does not transmit even though it is "ON." The invention can also provide an alarm that is activated whenever the SSLM is powered "ON." This mode of operation is useful for detecting persons that are not supposed to be in the water, such as small children who are outfitted with a monitor.

The invention is also capable of telemetering the data from the swimming area receivers to a central processor via wireless telemetry.

Yet another objective of the invention is to utilize computer systems to detect, display, and record all swimmer events of a potentially high risk nature occurring at pools, beaches, and water parks. The invention further is capable of recording all swimmer distress events in computer memory for playback and analysis at a later date if needed.

Other objectives and advantages of the SSLM system will be readily appreciated as the invention becomes better understood by reference to the following detailed descriptions when considered in conjunction with the accompanying drawings.

DETAILED DESCRIPTION OF THE INVENTION

Figure 1:
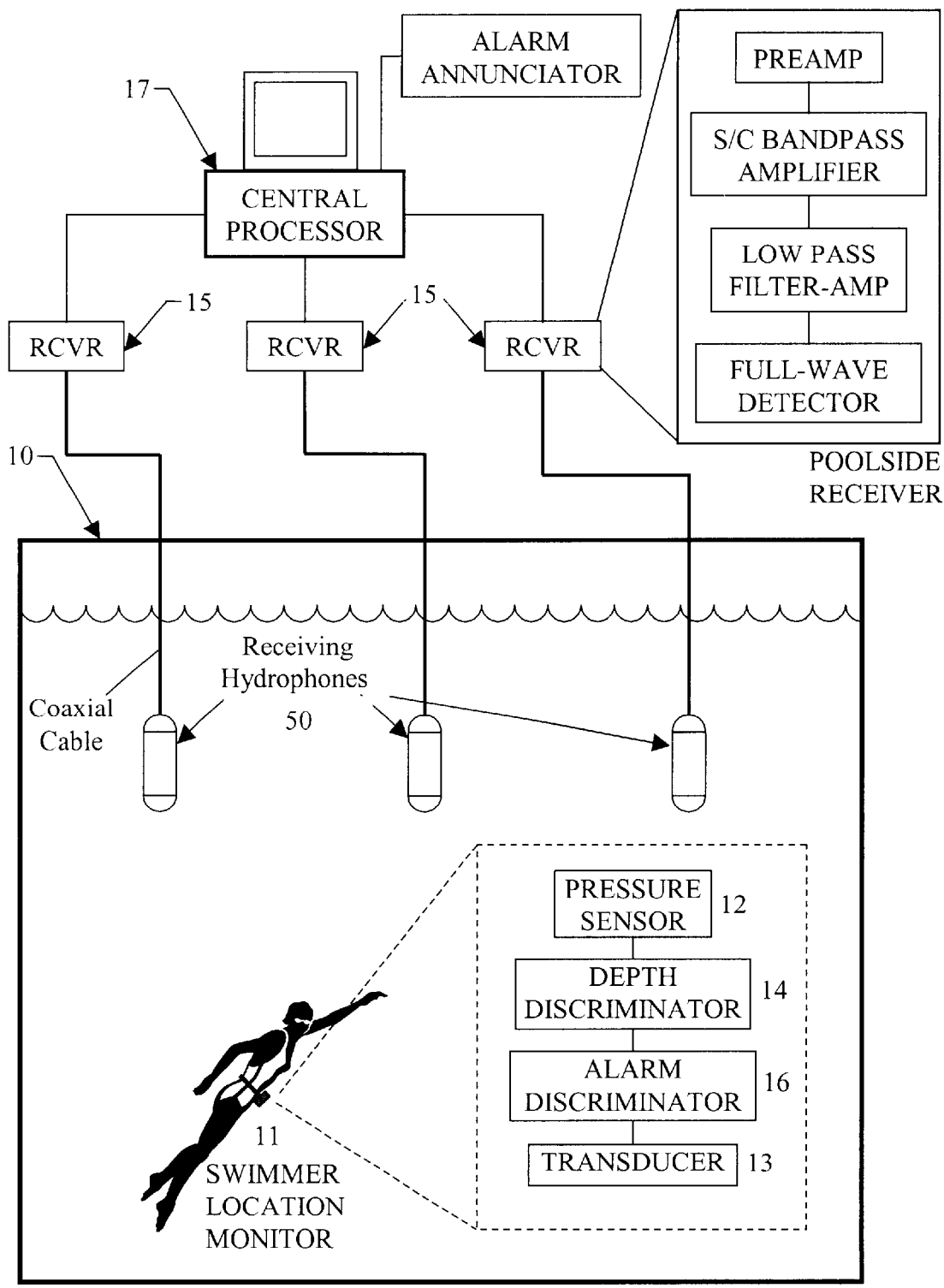
FIG. 1 is a diagrammatic illustration of the Sonar Swimmer Location System (SSLM) embodying the invention.

As used herein, "low frequency" refers to a range of 500–75,000 Hz and includes both sonic and ultrasonic frequencies.

The present invention is a low frequency sonar surveillance system for tracking the location of swimmers who may be in danger. Each swimmer is equipped with an individual Sonar Swimmer Location Monitor (SSLM) which transmits a series of ultrasonic pulses when specified thresholds monitored by the SSLM (such as depth and time) are exceeded. The invention transmits omnidirectional pulses through the water from a transducer contained in the SSLM to a network of receiving transducers deployed around the perimeter of the pool or water park. The invention amplifies, filters, and processes the received signals resulting in a graphical and/or numerical display of the distressed swimmer's location. The invention is also capable of triggering an alarm (audible or visual) whenever specified thresholds are exceeded.

In various environments the SSLM identifies swimmer distress by detecting water pressure, water depth, the amount of time spent in the water, and/or submersion in water. However, any criteria related to possible swimmer distress may be employed. The device also may be designed to interpret contact with water as a distress event, for example, to locate small children who have fallen into a swimming area.

Another embodiment of the present invention additionally can automatically power the SSLM whenever it is immersed in water and automatically power down whenever it leaves the water.

Other embodiments of the present invention include a capability of telemetering the data from the receivers to the central processor via wireless telemetry.

Still other embodiments of the invention include a capability of recording all swimmer events related to the use of the SSLM in computer memory for playback and analysis at a later date if necessary.

In a preferred embodiment, as a distressed swimmer sinks beneath the surface of the water, his/her SSLM senses an anomaly caused by exceeding a threshold water pressure for a threshold time period and activates a pinger to begin sending its pulsed alarm signal. The alarm signal is detected by one or more of the hydrophones and amplified and filtered by the receivers before passing it on to the central processor. The location of the distressed swimmer is determined by computer algorithms designed to process the signals received by the network of receivers. The signal processing algorithms minimize errors resulting from background noise, interference, and reflections from pool boundaries. As the alarm signal is flashed on the video display screen, an accompanying audible and/or visual alarm and location display is provided in the vicinity of the lifeguard station to alert the guard personnel of the swimmer distress.

In a preferred embodiment the invention comprises a process whereby the device worn by the swimmer is activated when certain predefined thresholds of depth and time are exceeded simultaneously. The SSLM is packaged in a miniature waterproof enclosure that is normally attached to a belt (other locations are possible) worn by the swimmer. In an alarm situation, the SSLM sends out ultrasonic pulses from a pinger contained in the device. Sufficient battery power is provided in the SSLM device to provide repetitive pulse transmission for a prescribed period of time. Sound waves propagate in water with little attenuation so receiving the signals over the limited dimensions of the pool or water park will not be difficult. The main problem will be dealing with the reflections that result from the boundaries of the pool or water park. Location errors resulting from these reflections are minimized in the data processing algorithms.

The receivers utilize low noise preamps, bandpass amplifiers, and low pass filters to provide primary signal conditioning. The receiver outputs are then cabled to a central processor with a CRT monitor that shows the outline of the pool and displays the location of any alarm signals that are detected. An alternate method of transmitting the receiver output signals to the central processor is one that uses short-range wireless telemetry. The SSLM terminal equipment may include video and audio alarm systems as well as a provision for recording all significant events.

Those skilled in the art recognize that the device worn by the swimmer may comprise any number of modes of detecting conditions related to the swimmer, that by way of example and not limitation can include the depth in the water, degree of movement, time spent at or under a certain depth or any one of a plethora of devices utilized for monitoring swimmer distress known in industry and in the art.

The following examples are offered by way of illustration and are not intended to limit the invention in any manner.

EXAMPLE 1

SSLM System for a Swimming Pool

Figure 2:
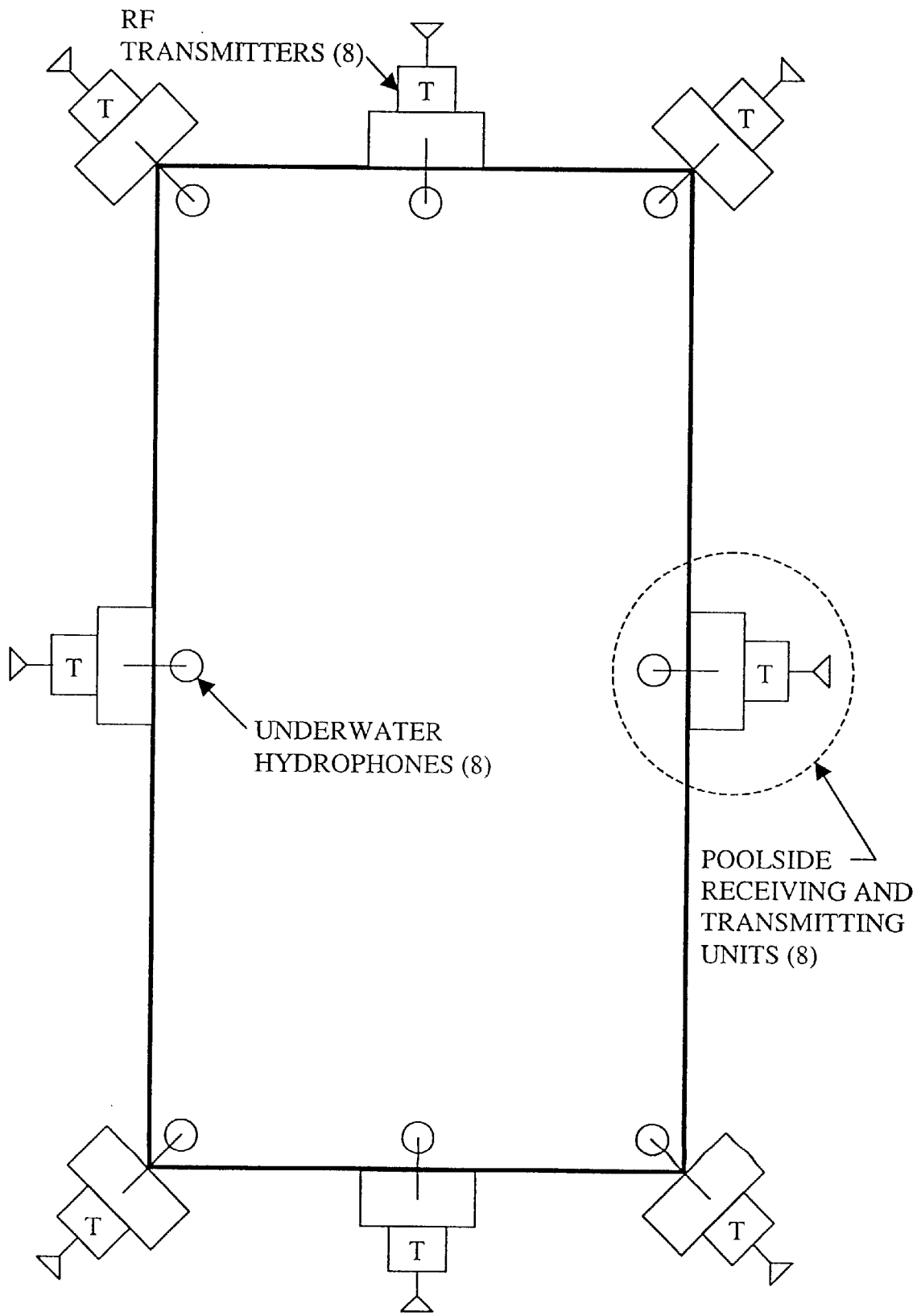
FIG. 2 is a plan view of a typical SSLM hydrophone array deployment scheme.
Figure 3A:
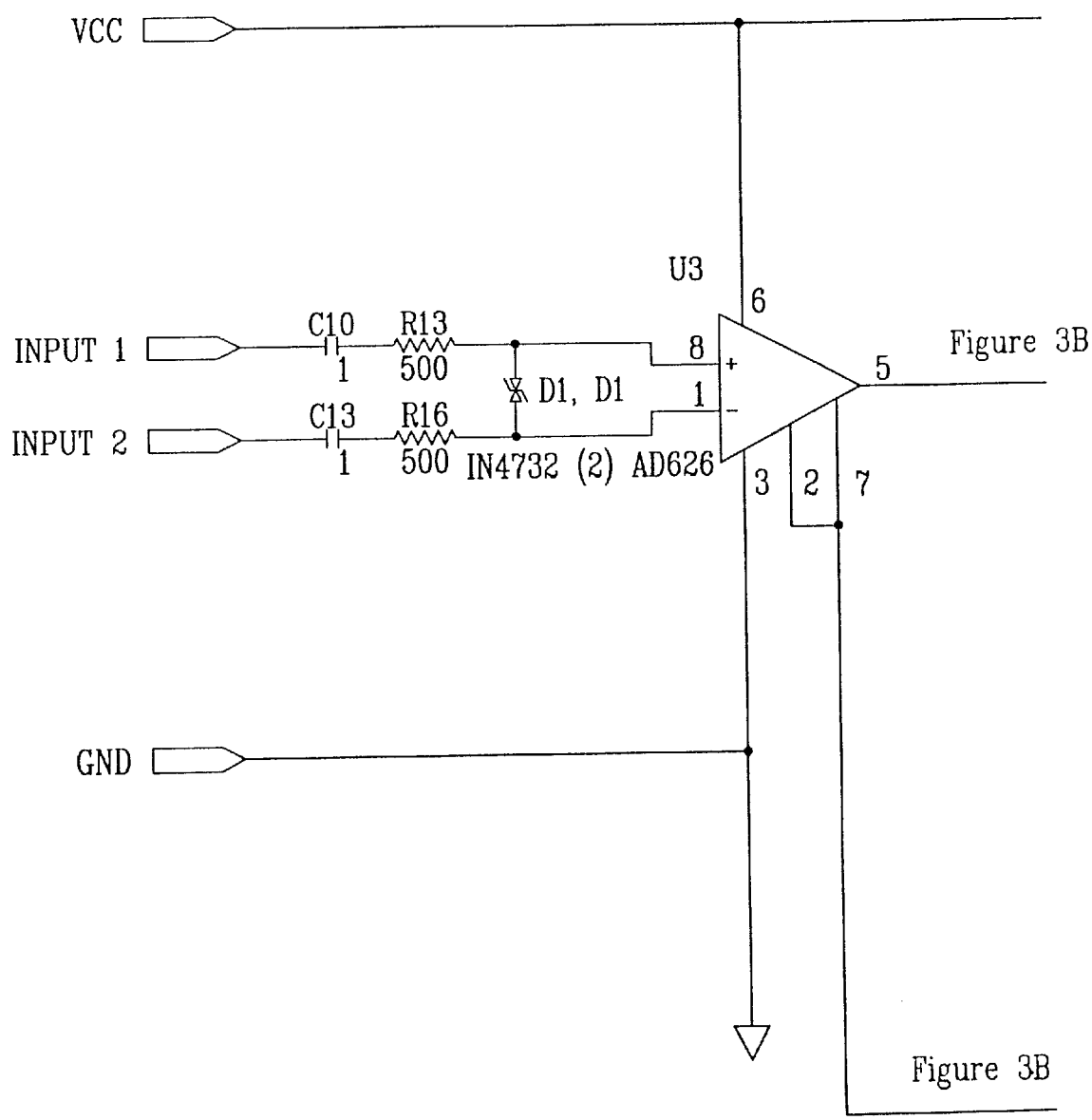
FIGS. 3 (3A–3G) is a schematic diagram of a single receiver channel.
Figure 3B:
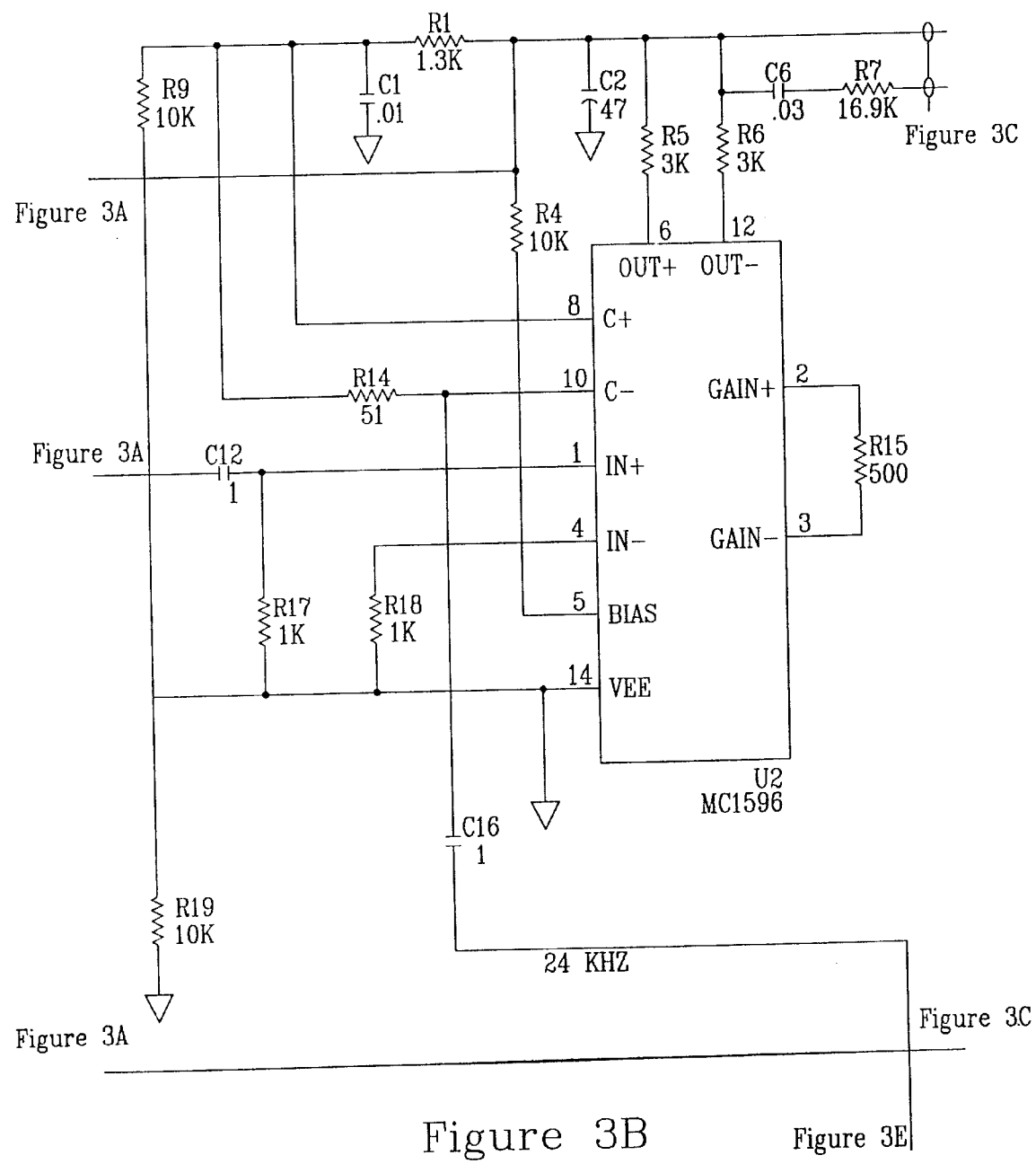
Figure 3C:
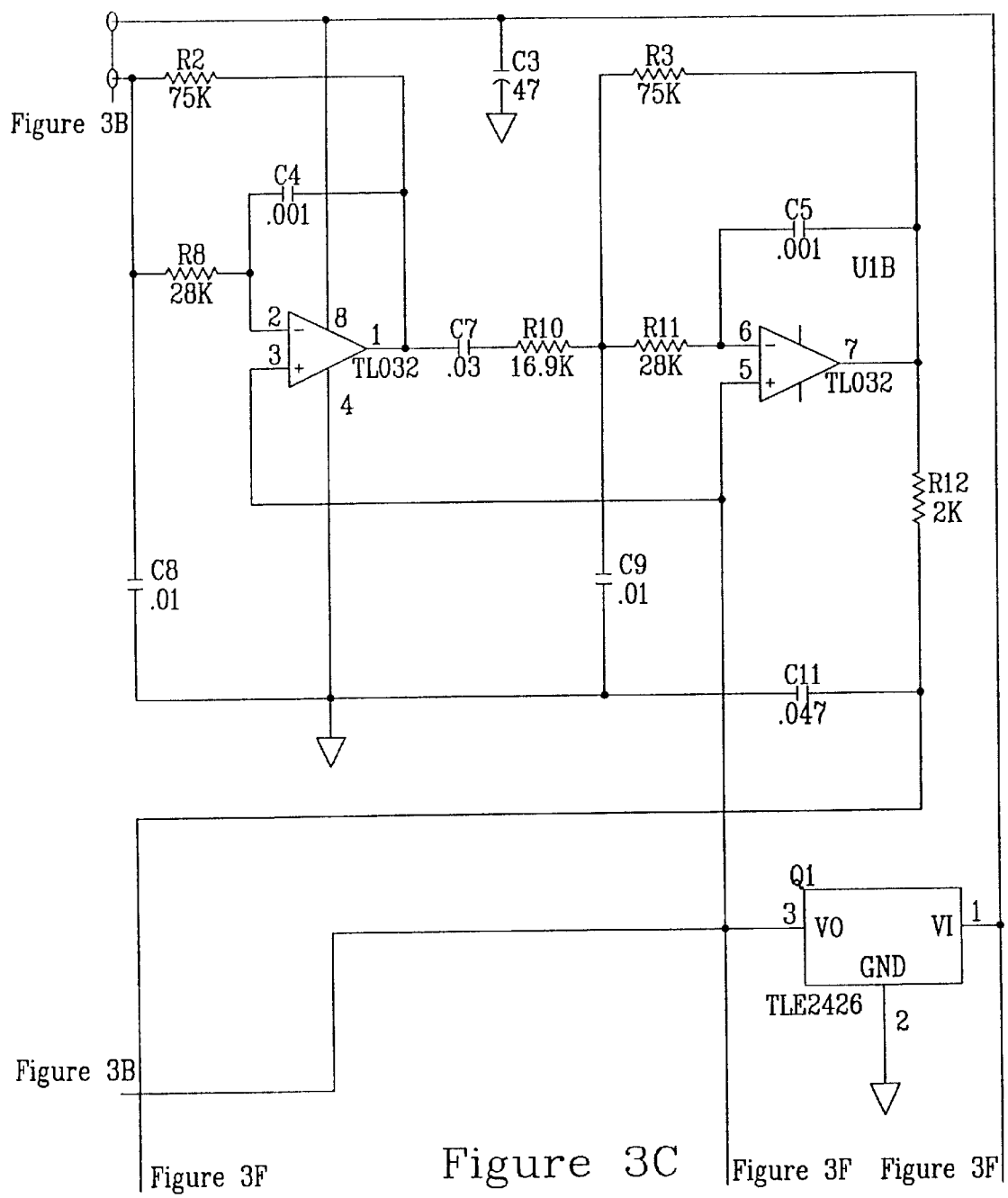
Figure 3D:
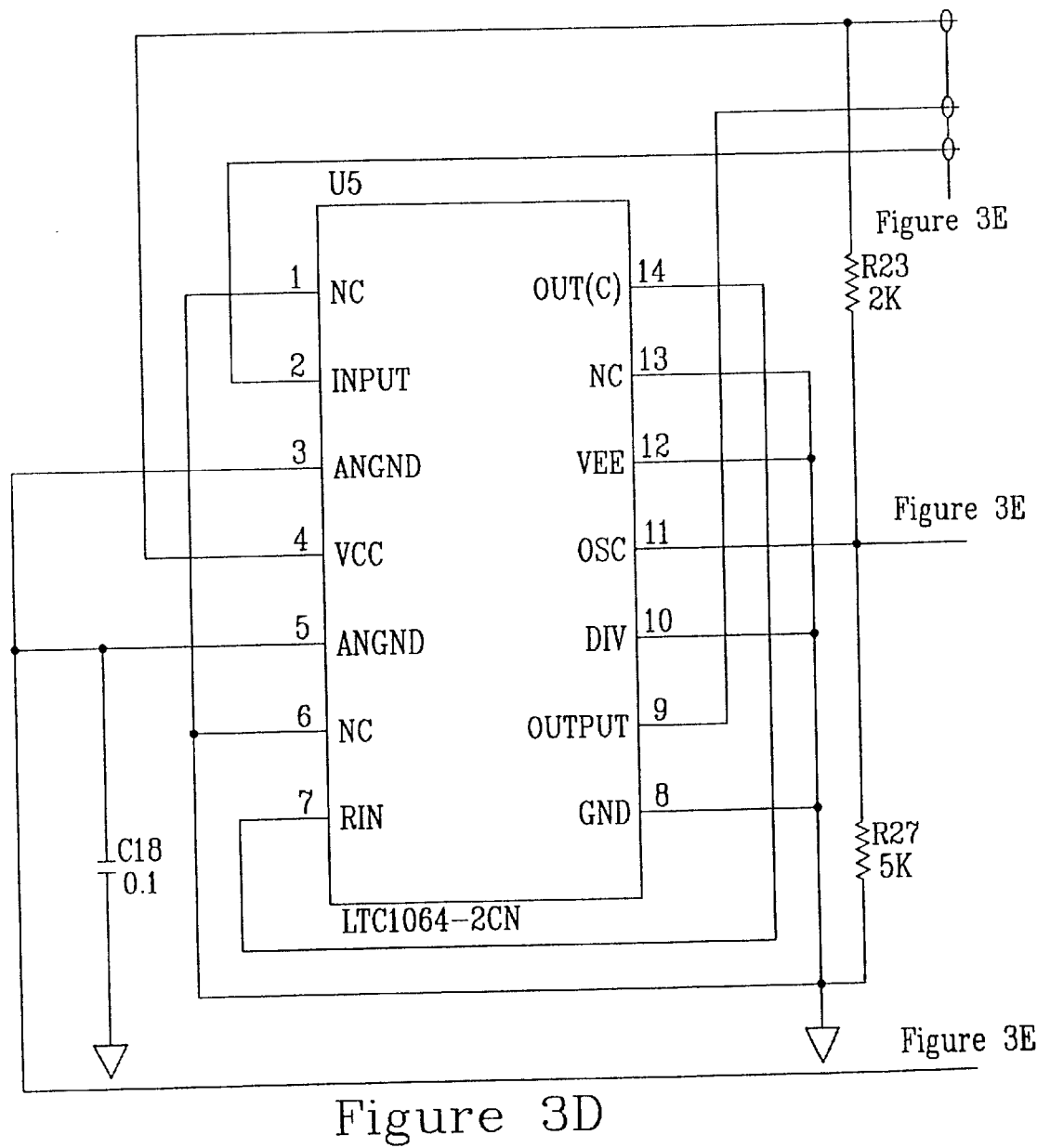
Figure 3E:
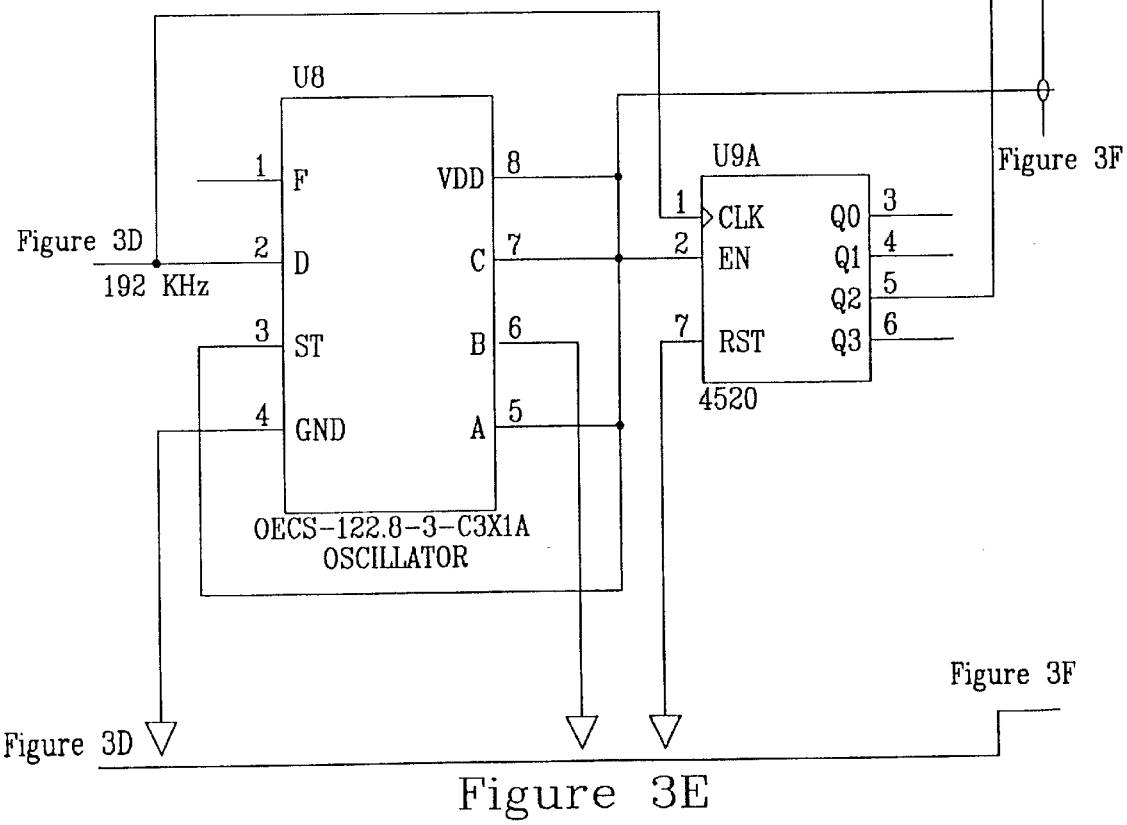
Figure 3F:
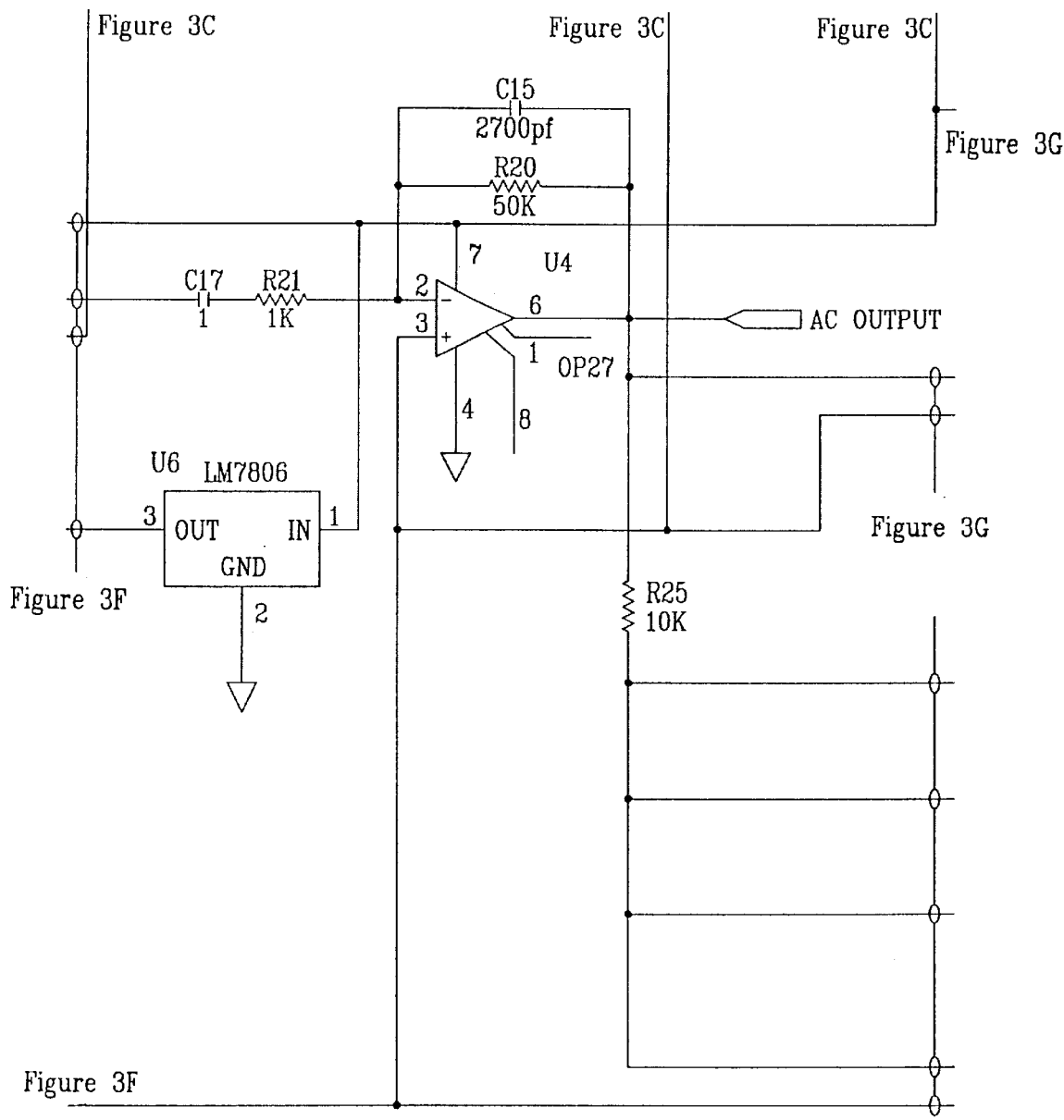
Figure 3G:
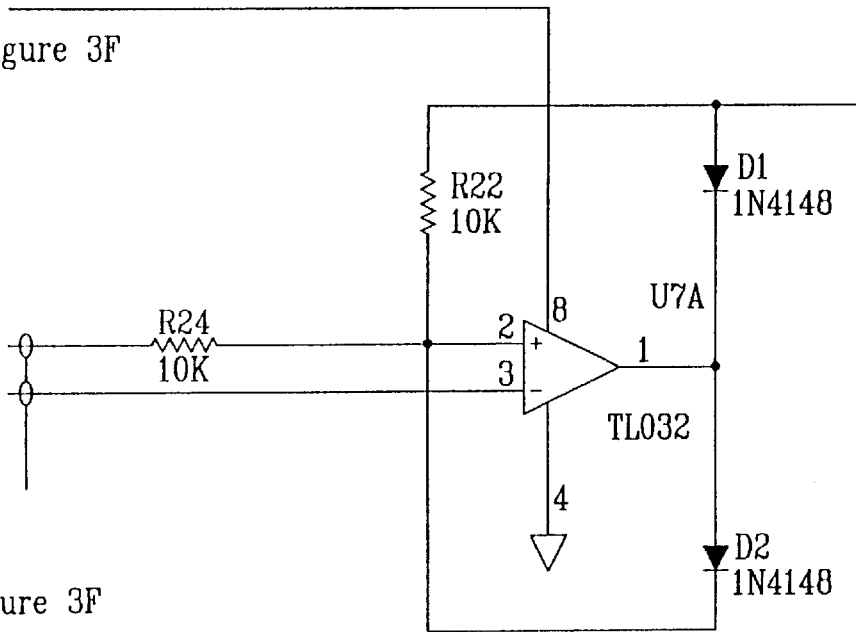
Figure 3G:
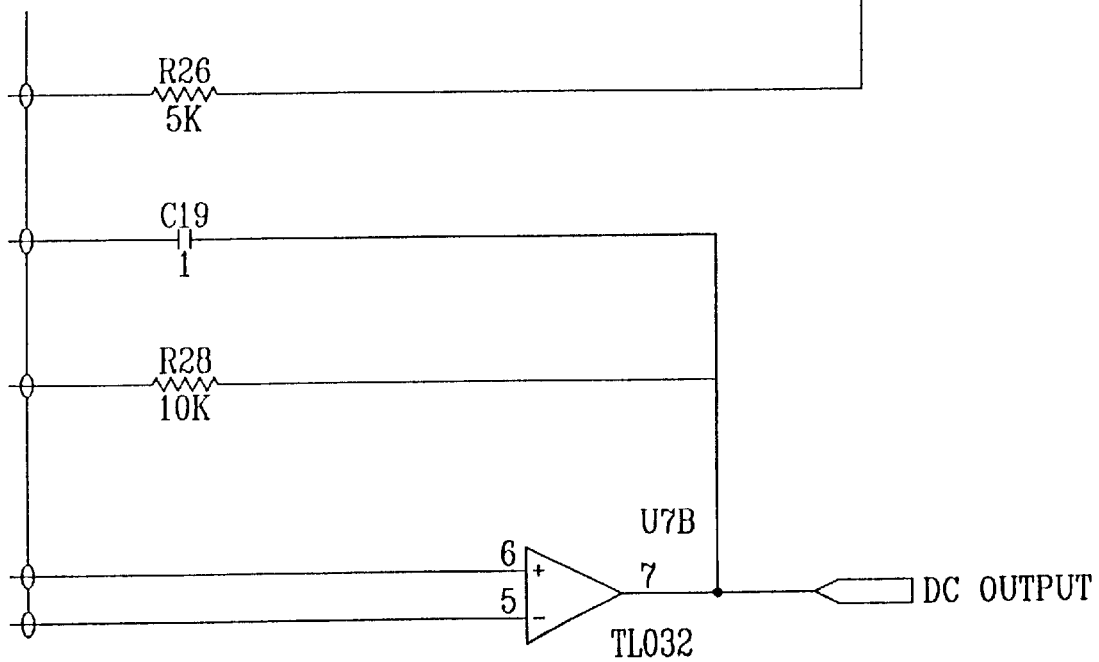

In the illustration provided in FIG. 1 there is shown a Sonar Swimmer Location Monitor (SSLM) System 10 which is designed to alert guard personnel when a swimmer is at risk. FIG. 2 illustrates a typical SSLM deployment scheme, and more particularly, an SSLM hydrophone array deployment scheme. The swimmer wears a small belt-mounted device called the SSLM 11 that senses depth over repetitive time intervals and decides when the individual is at risk. The transmitting transducer (pinger) 13 is thus triggered "ON" and sends out ultrasonic pulses that are received by a network of hydrophones 50 around the pool. Each hydrophone is connected to a receiver 15 and the outputs of the receivers are cabled to the central processor unit 17 that computes and displays the swimmer's location.

For smaller swimming areas that do not wish to invest in a complete computer and graphic user interface, a simplified alarm annunciator can be used to indicate the presence of an alarm situation without pinpointing the swimmer's location.

EXAMPLE 2

Mode of Operation

The SSLM transmitting device 11 worn by the swimmer is packaged in a waterproof container the approximate size of a pack of playing cards. It attaches to an adjustable belt or other means of fastening the device that is worn by the swimmer at all times he/she is in the water, or near the water. Battery power is automatically applied to the device whenever the unit is submerged in the water. Under nonemergency or non-distress conditions the drain on the battery will be insignificant, on the order of a few milliamps. Only when a potentially distressed swimmer event occurs and the unit triggers the transmitter "ON" does the current drain on the battery rise to about 100 milliamps. The SSLM unit 11 is designed for at least one hour of transmission under swimmer distress conditions. Because the application of power is automatic, the device can also be used to detect persons who fall into the water.

Under normal operation (for water parks, pools, beaches, and other swimming area applications), the SSLM unit 11 senses waterpressure/depth (e.g., via a pressure sensor 12) and triggers a counter (e.g., a depth discriminator 14) to count the time that a predefined water pressure is exceeded (for example, that pressure associated with a 3 ft. depth of the belt worn unit). When that water pressure is exceeded on a continuous basis for a predefined time interval (e.g., alarm discriminator 16), for example, 30 seconds, a potential swimmer distress is identified, and the pinger 13 begins transmitting. The ultrasonic waves emitted by the pinger 13 are received by one or more of the hydrophones 50 surrounding the swimming area and the SSLM location is quickly determined via triangulation algorithms and displayed by the central processor. Also, the guard personnel may be alerted by an audible and/or visual alarm that is sounded at their duty station, and with a remote display of the SSLM location.

FIG. 3 (3A–3G) is a schematic of one of the receiver channels 15. These units are packaged in water-resistant enclosures (since these are located generally near the terminals of the underwater hydrophone cables) and are securely mounted in a protected location. Preferably, the units are powered using long-life rechargeable batteries. The hydrophone cable is connected to the receiver input amplifier U3. The amplified signal is then fed to a bandpass amplifier U2 which is a superheterodyne amplifier that amplifies the signal by a factor of 1000. The typical bandpass characteristics of U2 include a center frequency of 25,000 Hz and a bandwith of 1,000 Hz. The remaining circuitry in the receiver consists of a two stage active low-pass filter (U1A and U1B) followed by a switched capacitor low-pass filter U5. The signal is then fed through another amplifier U4 to a two-stage detector-filter combination (U7A and U7B). Frequency is controlled by an oscillator-divider combination (U8 and U9A). The alarm signal is characterized as a repetitive tone pulse of 25,000 Hz ultrasonic energy operating at a 10 percent duty cycle at a rate of one pulse per second. In response to this signal, the receiver output is a dc pulse of 100 millisecond duration appearing every second.

The terminal equipment (central processor) 17 operates on these pulses in a straightforward manner. A central processing unit consisting of a computer and monitor is used in most cases. Normally they are equipped with a Graphic User Interface (GUI) enabling the computer to show the plan view of the water area of the pool, water park, or beach with flashing symbols to show the location of the SSLM transmissions.

All references mentioned in this specification are herein incorporated by reference.

We claim:

1. A low frequency SONAR surveillance system for tracking the location of swimmers who may be in danger comprising:

a means for detecting potential or actual swimmer distress for each swimmer equipped with an individual SONAR Swimmer Location Monitor (SSLM) wherein said means triggers a pulsed low frequency sonic or ultrasonic, or combination thereof, alarm transmission when specified thresholds monitored by said SSLM and which indicate potential or actual swimmer distress are exceeded;

a means for generating sonic, ultrasonic, or combination thereof, waves through the water from a transducer (pinger) contained in the SSLM to transmit said alarm transmission to position remote from the swimmer;

a means remotely located from the swimmer for receiving said sonic, ultrasonic, or combination thereof, alarm transmission using an array of hydrophones;

a means for amplifying, filtering and processing the received sonic, ultrasonic, or combination thereof, alarm transmission to track the distressed swimmer's location; and a means for triggering an audible alarm whenever said specified thresholds are exceeded.

2. The system of claim 1, wherein said low frequency is in the range of 500–75,000 Hz, including both sonic and ultrasonic signals.

3. The system of claim 1, wherein said low frequency is approximately 25,000 Hz.

4. The system of claim 1, wherein said SSLM measures potential or actual swimmer distress by monitoring one or more conditions selected from the group of conditions consisting of: water pressure, water depth, time duration the sensor is in the water environment, submergence of the sensor in the water environment, and sensor contact with the water environment.

5. The system of claim 1 wherein said transmitted sonic, ultrasonic, or combination thereof wave is generated in a pinger contained within the SSLM.

6. The system of claim 1 wherein said means for receiving said sonic, ultrasonic, or combination thereof waves comprises a network of hydrophones deployed around the swimming area.

7. The invention of claim 6 wherein said hydrophones are deployed along the perimeter of a swimming pool, in the swimming area of a beach, in the water area of a water park or any other swimming area.

8. The system of claim 1, the system further comprising a means for automatically powering the SSLM whenever it is immersed in water and automatically powering down whenever it leaves the water.

9. The system of claim 1, the system further comprising means for telemetering the data from said receivers to a central processor via wireless telemetry.

10. The system of claim 1, the system further comprising means for determining location of the distressed swimmer by triangulation algorithms.

11. The system of claim 1, the system further comprising a means for recording all swimmer distress events in computer memory for playback and analysis at a later date.

12. The system of claim 1 wherein said display is a graphical display, a numerical display, or a combination thereof.

13. A surveillance system for indicating the approximate remote location of a person in a water environment, said surveillance system comprising:

a least one sensor retainable by the person in the water environment, said sensor being adapted to sense at least one condition relating to the environment immediate the person in the water environment;

a SONAR transmitter operably coupled with said sensor so as to transmit a SONAR signal to a remote receiver upon said sensor sensing said at least one condition to have a value corresponding to one or more predetermined values;

a remote SONAR receiver array configured to receive said SONAR signal; and, a signal processor operably coupled with said SONAR receiver array to process said SONAR signal and provide an output remote from the person in the water environment and indicative of the approximate location of the person in the water environment.

14. The surveillance system of claim 13, wherein said SONAR signal is a low frequency SONAR signal.

15. The surveillance system of claim 14, wherein said low frequency signal is within a signal range of about 500 Hz to about 75,000 Hz.

16. The surveillance system of claim 13, wherein said condition is selected from a group of conditions consisting of: water pressure, water depth, time duration the person is in the water environment, submergence of the person in the water environment, and contact with the water environment.

17. The surveillance system of claim 13, wherein said condition is a measurable physical property of the environment proximate the person in the water environment.

18. The surveillance system of claim 13, further comprising a display operably coupled with said signal processor and adapted to display an output indicative of an approximate location of the person in the water environment.

19. The surveillance system of claim 18, wherein said output display is an alphanumerical display.

20. The surveillance system of claim 18, wherein said output display is a graphical display.

21. The surveillance system of claim 13, further comprising an alarm configured to activate upon receipt of a SONAR signal by said receiver array.

22. The surveillance system of claim 21, wherein said alarm is an audible alarm.

23. The surveillance system of claim 21, wherein said alarm is a visual alarm.

24. The surveillance system of claim 13, further comprising an alarm operably coupled with said signal processor to indicate when a SONAR signal is received.

25. This surveillance system of claim 13, wherein said SONAR receiver array includes one or more hydrophones.

26. The surveillance system of claim 13, wherein said signal processor includes one or more signal receivers operably coupled with said SONAR receiver.

27. The surveillance system of claim 26, wherein said signal processor further includes a central processor operably connected with each of said signal receivers.

28. The surveillance system of claim 13, further comprising a belt, said sensor and said transmitter being secured to said belt.

29. The surveillance system of claim 28, further comprising a housing wherein said sensor and said transmitter are disposed, said housing being securable to said belt.

30. The surveillance system of claim 13, wherein said signal processor further includes a telemetering device for wirelessly telemetering data from said SONAR receivers to a central processor.

31. A method for indicating, on a user interface, the approximate remote location of a person in a water environment, said method comprising the steps of:

providing at least one sensor adjacent and movable with the person;

providing a SONAR transmitter adjacent and movable with the person;

providing an array of SONAR receivers positioned remote from the person;

providing a signal processor having a user interface remote from the person, and operably coupled with the SONAR receivers;

selecting at least one condition relating to the environment immediate the person in the water environment;

using the sensor to sense the condition relating to the environment immediate the person in the water environment;

transmitting a SONAR signal via the SONAR transmitter upon the sensor sensing the value of the condition as corresponding to one of one or more predetermined values;

receiving the SONAR signal via the array of SONAR receivers; and processing the received SONAR signal to provide an output on the user interface, wherein the output informs the user of the remote location of the person in the water environment.

32. The method of claim 31, further comprising the step of displaying, via the user interface, a graphical approximation of the location of the person in the water environment.

33. The method of claim 31, further comprising the step of displaying, via the user interface, an alphanumerical approximation of the location of the person in the water environment.

34. The method of claim 31, further comprising the step of sounding an audible alarm, after the step of receiving the SONAR signal.

35. The method of claim 31, further comprising the step of displaying a visual alarm, after the step of receiving the SONAR signal.

36. The method of claim 31, wherein said sensing step includes monitoring one or more conditions selected from the group of conditions consisting of: water pressure, water depth, time duration the sensor is in the water environment, submergence of the sensor in the water environment, and sensor contact with the water environment.

37. The method of claim 31, wherein said sensing step includes monitoring a measurable physical property of the environment proximate the person in the water environment.

38. The method of claim 31, wherein said transmitting step includes transmitting a SONAR signal at a frequency within a range of about 500 Hz to about 75,000 Hz.

39. The method of claim 31, further comprising the steps of:

providing the sensor and the transmitter in the housing;

providing a belt wearable by the person in the water environment;

securing the housing on the belt; and securing the belt to the person in the water environment.

40. The method of claim 31, wherein said step of providing an array of SONAR receivers includes providing a plurality of hydrophones at a plurality of locations relative to the water environment.

41. The method of claim 40, wherein the step of providing a signal processor includes providing a plurality of receiver channels each operably connected to one of the hydrophones.

42. The method of claim 41, wherein the processing step includes using the signal processor to amplify and filter the received signal from the hydrophones.

43. The method of claim 31, further comprising the step of wirelessly telemetering data from the array of SONAR receivers to a control processor.

44. The method of claim 31, further comprising the step of using the signal processor to determine location of the person in the water environment using triangulation algorithms.

45. A swimmer surveillance system for determining and indicating, on a user interface, the approximate remote location of a swimmer in a water environment, the surveillance system comprising:

a sensor housing containing at least one sensor adapted to sense a measurable physical property of the environment immediate the swimmer in the water environment and a SONAR transmitter operably coupled with said sensor so as to transmit a SONAR signal at a frequency between about 500 Hz to about 75,000 Hz, when said measurable physical value is sensed by said sensor to have a value exceeding a predetermined threshold;

a plurality of SONAR hydrophone receivers positioned remote from the swimmer and configured to receive said SONAR signal; and a signal processor having a user interface, said signal processor being operably coupled with said SONAR receivers and adapted to process said received SONAR signal and provide an output on the user interface indicative of the approximate location of the person in the water environment.

46. The surveillance system of claim 45, wherein said measurable physical property is a property selected from a group of properties consisting of: water pressure, water depth, time duration of the swimmer in the water environment, submergence of the swimmer in the water environment, and sensor contact with the water environment.

47. The surveillance system of claim 45, wherein said signal processor includes a plurality of signal conditioning receivers for receiving a signal from said hydrophones and a central processor having said user interface.

48. The surveillance system of claim 47, wherein said signal processor includes a telemetering device for transmitting, by wireless telemetry, output signals from the signal conditioning receivers to said central processor.

* * * * *